United States Patent [19]

Akiyama et al.

[11] Patent Number: 5,159,478

[45] Date of Patent: Oct. 27, 1992

[54] TRANSMISSION LIQUID CRYSTAL DISPLAY APPARATUS

[75] Inventors: Masahiko Akiyama, Kawasaki; Kouji Suzuki, Yokohama; Mamoru Tominaga, Kawagoe, all of Japan

[73] Assignee: Kabushiki Kaisha Toshiba, Kawasaki, Japan

[21] Appl. No.: 385,092

[22] Filed: Jul. 26, 1989

[30] Foreign Application Priority Data

Jul. 28, 1988 [JP] Japan .................... 63-186820

[51] Int. Cl.⁵ .................................................. G02F 1/13
[52] U.S. Cl. ........................................ 359/69; 359/64; 359/68
[58] Field of Search ..................... 359/68, 69, 64; 358/456, 59, 60; 353/84

[56] References Cited

U.S. PATENT DOCUMENTS

| | | | |
|---|---|---|---|
| 4,294,524 | 10/1981 | Stolov | 359/68 |
| 4,330,813 | 5/1982 | Deutsch | 340/784 |
| 4,431,266 | 2/1984 | Mori et al. | 359/456 |
| 4,443,814 | 4/1984 | Mori et al. | 358/60 |
| 4,502,755 | 3/1985 | Mori et al. | 359/456 |
| 4,538,216 | 8/1985 | Mori et al. | 359/456 |
| 4,610,507 | 9/1986 | Kamamori et al. | 350/339 F |
| 4,621,260 | 11/1986 | Suzuki et al. | 340/719 |
| 4,659,183 | 4/1987 | Suzawa | 350/339 D |
| 4,660,936 | 4/1987 | Nosker | 350/339 D |
| 4,700,458 | 10/1987 | Suzuki et al. | 437/83 |
| 4,722,593 | 2/1988 | Shimazaki | 350/339 F |
| 4,798,448 | 1/1989 | van Raalte | 350/339 F |
| 4,837,098 | 6/1989 | Shimamura et al. | 350/339 F |
| 4,877,309 | 10/1989 | Takamatsu | 350/339 F |

FOREIGN PATENT DOCUMENTS

| | | | |
|---|---|---|---|
| 60-2918 | 1/1985 | Japan . | |
| 61-3125 | 1/1986 | Japan . | |
| 62-55624 | 3/1987 | Japan | 350/339 D |
| 62-124526 | 6/1987 | Japan | 350/339 F |
| 63-43191 | 2/1988 | Japan . | |
| 63-82406 | 4/1988 | Japan . | |
| 63-95489 | 4/1988 | Japan . | |
| 63-26843 | 7/1988 | Japan . | |

OTHER PUBLICATIONS

Patent Abstracts of Japan, vol. 11, No. 345 (P-636)[2792], Nov. 12, 1987; & JP-A-62 127 717 (Toshiba Corp.) Oct. 6, 1987 *Abstract*.

*Primary Examiner*—Andrew J. James
*Assistant Examiner*—Sara W. Crane
*Attorney, Agent, or Firm*—Oblon, Spivak, McClelland, Maier & Neustadt

[57] ABSTRACT

In a transmission liquid crystal display apparatus, light rays emitted from a light source and reflected from a mirror are collimated by a collimator lens and incident in a liquid cell structure through a polarization layer. The light rays emerged from the structure are transmitted through an another polarization layer and diffused by a diffusion layer. The diffusion light rays pass through a filter layer to a viewer.

18 Claims, 7 Drawing Sheets

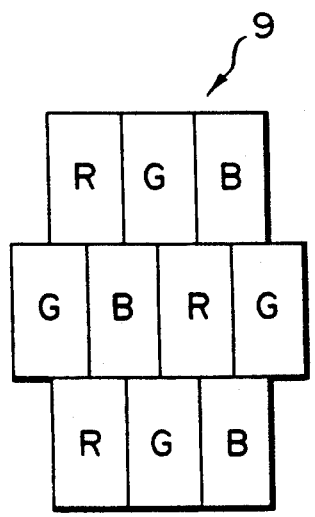
F I G. 14A
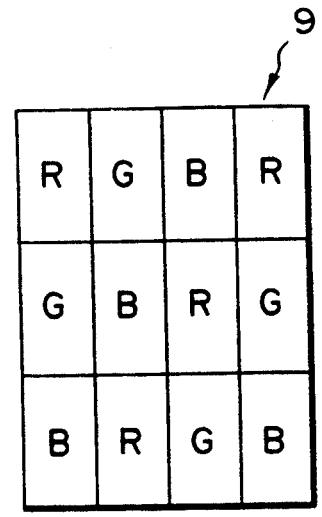
F I G. 14B
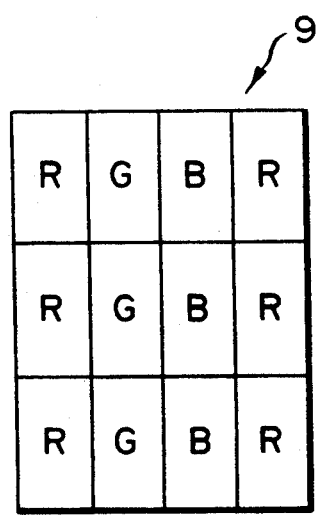
F I G. 14C
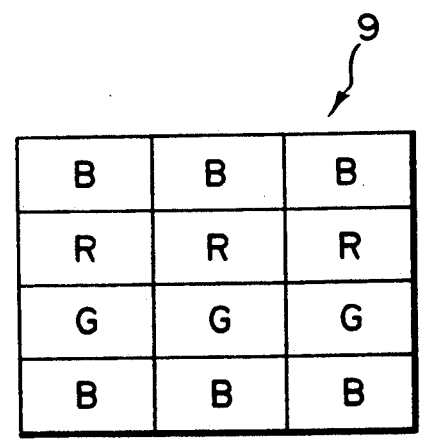
F I G. 14D

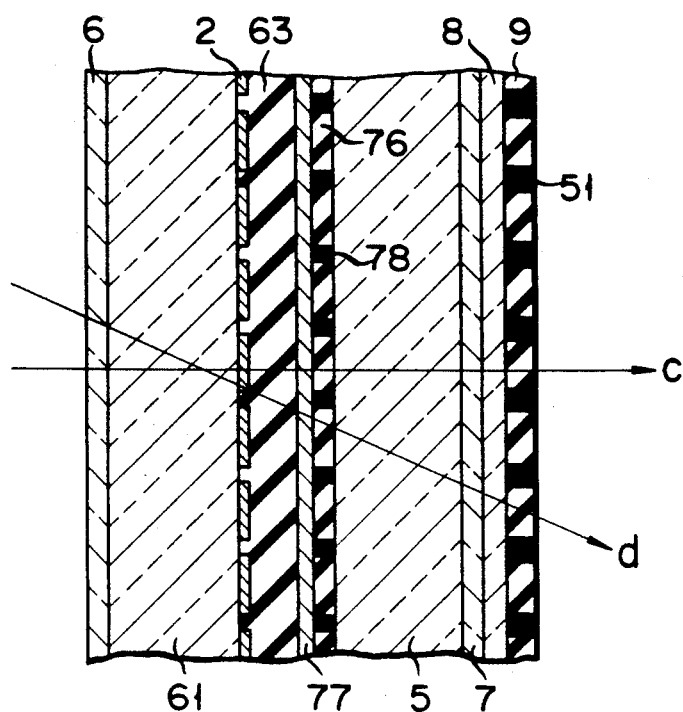
FIG. 15
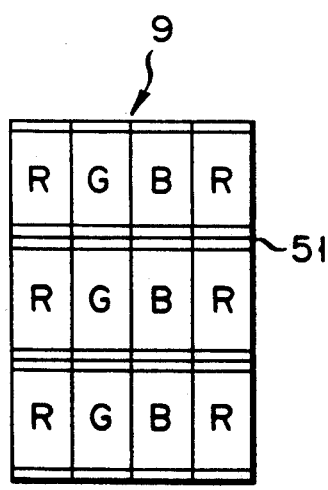 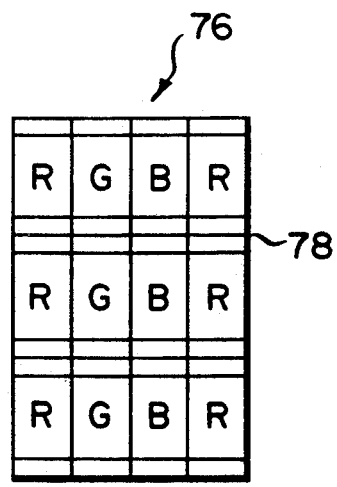
FIG. 16A       FIG. 16B

TRANSMISSION LIQUID CRYSTAL DISPLAY APPARATUS

BACKGROUND OF THE INVENTION

1. Field of the Invention

The present invention relates to a transmission liquid crystal display apparatus and, more particularly, to a transmission color liquid crystal display apparatus in which a color filter is arranged at the display surface side of a liquid crystal cell and a light source is arranged at its rear surface side.

2. Description of the Related Art

A liquid crystal display apparatus is widely used as a flat type, low-power consumption display. Especially in recent years, significant technical developments have been made to increase the number of pixel segments and the size of a screen. Therefore, for a binary-leveled display, an apparatus having 640×400 pixels and a diagonal of 10 inches or more is now available. In addition, a liquid crystal TV capable of halftone display by using an active matrix type liquid crystal is put into practical use. The active matrix system in which crosstalk does not occur and the number of pixel segments can be easily increased is expected to be used as a future large screen.

Liquid crystals driven by the active matrix system are mostly of a twisted nematic (TN) type and then of a guest host (GH) type. The TN type has advantages such as a high liquid crystal resistance, a high pixel segment voltage holding rate, and a high contrast ratio of 30 to 100 or more. The TN type, however, has a problem of a narrow angle of view (especially in a specific direction). The GH type has a wider angle of view than that of the TN type but inferior to the TN type in other factors. In addition, in the GH type, a dye is decolored upon light radiation over a long time period to reduce a contrast.

A narrow angle of view of the TN type liquid crystal display apparatus is problematic especially in a halftone display in which liquid crystal molecules are obliquely aligned. This problem appears as a phenomenon in which if a screen size is increased, a contrast differs between upper and lower portions or right and left portions even with the same voltage. That is, image quality is degraded when the screen size is increased. In addition, light transmittance dependency with respect to a pixel segment voltage differs between the normal direction and the oblique direction on the screen. Therefore, in a color display in which a color filter is provided for each pixel segment, a color tone differs in the normal and oblique directions. As a result, image information undesirable differs in accordance with the viewing direction.

FIG. 1 shows an arrangement of a conventional transmission color liquid crystal display apparatus. Referring to FIG. 1, reference numeral 61 denotes an active matrix substrate; 62, a polarizing plate; 63, a pixel segment electrode; 64, a counter electrode; 65, a TN type liquid crystal layer; 66, a color filter layer; 67, a glass plate; 68, a polarizing plate; 69, a light source; and 70, a light diffusion plate arranged in front of the light source 69.

This conventional display apparatus has the following problem concerning an angle of view. Light rays from the light source 69 are diffused in all directions by the diffusion plate 70. As a result, the light rays from a liquid crystal cell can be observed in the normal direction and a direction oblique with respect to the display surface. In FIG. 1, assume that light rays transmitted through a certain pixel segment corresponding to a certain color in the normal direction are light rays A and those in the oblique direction are light rays B, and light rays transmitted through a pixel segment adjacent to the above pixel segment and corresponding to another color in the normal direction are light rays A' and those in the oblique direction are light rays' B. When a voltage of the latter pixel segment is set in a light-shut state, i.e., when a shutting voltage is applied to the pixel segment electrode 63, the intensity of the light rays A' is low and that of the light rays A is high in the normal direction. Therefore, the rays can be viewed on the screen as chromaticity at a point A corresponding to the light rays A in a chromaticity diagram shown in FIG. 2. In the oblique direction, however, the intensity of the light rays B' is higher than that of the light rays A' since the angle of view of the liquid crystal is narrow. Therefore, the light rays B' are mixed and viewed together with the light rays B' i.e., the adjacent light rays having different colors are mixed. As a result, the rays are moved in a white direction (arrow direction) in the chromaticity diagram in FIG. 2 and viewed as a color close to white on the screen. For this reason, image quality of a flat type TV using the conventional liquid crystal is inferior to that of a CRT. Therefore, applications of such a flat type TV are limited to hobbies such as a pocket TV.

As described above, it is difficult to obtain a large screen by using the conventional transmission liquid crystal display apparatus since the angle of view of the liquid crystal is narrow. Especially in a color display, image quality in a halftone display is poor.

SUMMARY OF THE INVENTION

It is an object of the present invention to provide a transmission liquid crystal display apparatus in which a display on a screen can be clearly observed throughout a wide viewing angle.

In the transmission color liquid crystal display apparatus, a color filter is arranged at the display surface side of the liquid crystal cell and a light source is arranged at its rear surface side. This display apparatus includes a means for substantially collimating light rays radiated on a liquid crystal display cell, and a light diffusion layer or film arranged between the liquid crystal cell and the color filter. In the display apparatus of the present invention, the color filter may have a function of diffusing light rays in place of the light diffusion layer or film.

In order to view the display apparatus not only in the normal direction but also in an oblique direction of the display screen, light rays must be substantially diffused. For this purpose, in a conventional apparatus, light rays from a light source are radiated on a liquid crystal cell as diffused light rays. As described above, however, the transmittance of the liquid crystal cell differs in transmitting directions. When collimated rays are radiated on the liquid crystal cell as in the present invention, the intensity of the transmitted light rays is modulated into a value uniquely determined by an application voltage. When the transmitted light rays are diffused and viewed, a modulation degree becomes constant in any direction, and image quality in a halftone display is improved. In addition, since the conventional problem of a color tone difference depending on the viewing direction in a color display is solved, good image quality can be obtained in wide angle of view. Furthermore, the light diffusing function is provided between the color filter and the liquid crystal cell or integrated with the color filter. Therefore, since each pixel segment clearly corresponds to the color filter, the pixel segment is not obscured, and a clear screen can be obtained.

BRIEF DESCRIPTION OF THE DRAWINGS

FIGS. 14A to 14D show various arrangements of color filter layers applied to the liquid crystal cell structure shown in FIG. 12;

FIG. 15 is a sectional view showing a liquid crystal cell structure according to a still another embodiment of the invention; and FIGS. 16A to 16B show arrangements of first and second color filter layers incorporated into the liquid crystal cell structure shown in FIG. 15.

DETAILED DESCRIPTION OF THE PREFERRED EMBODIMENTS

An embodiment of the present invention will be described below.

Figure 1:
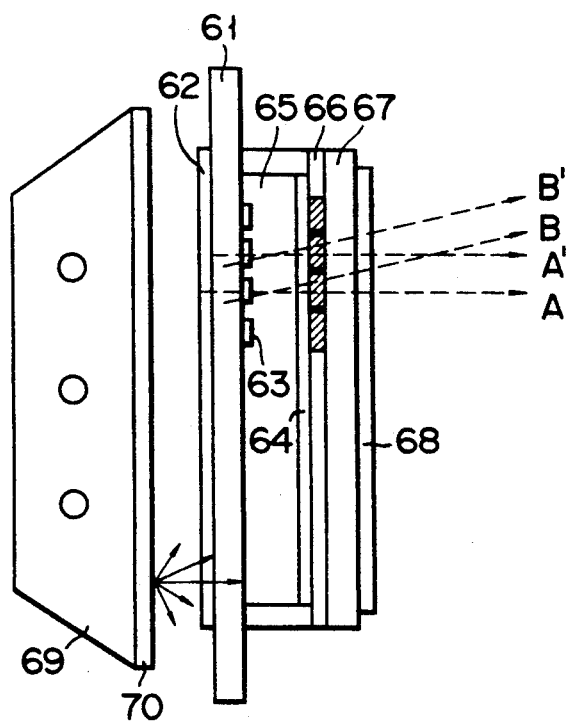
FIG. 1 is a schematic view showing a conventional transmission liquid crystal display apparatus.
Figure 2:
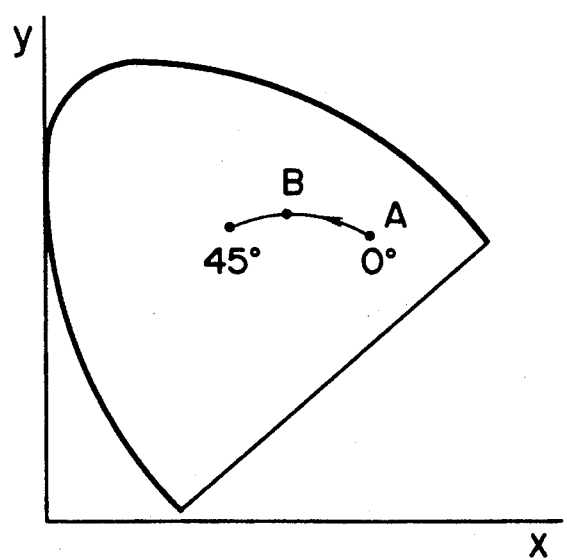
FIG. 2 is a chromaticity diagram for explaining a color tone change with respect to an angle of view of the apparatus shown in FIG. 1.
Figure 3:
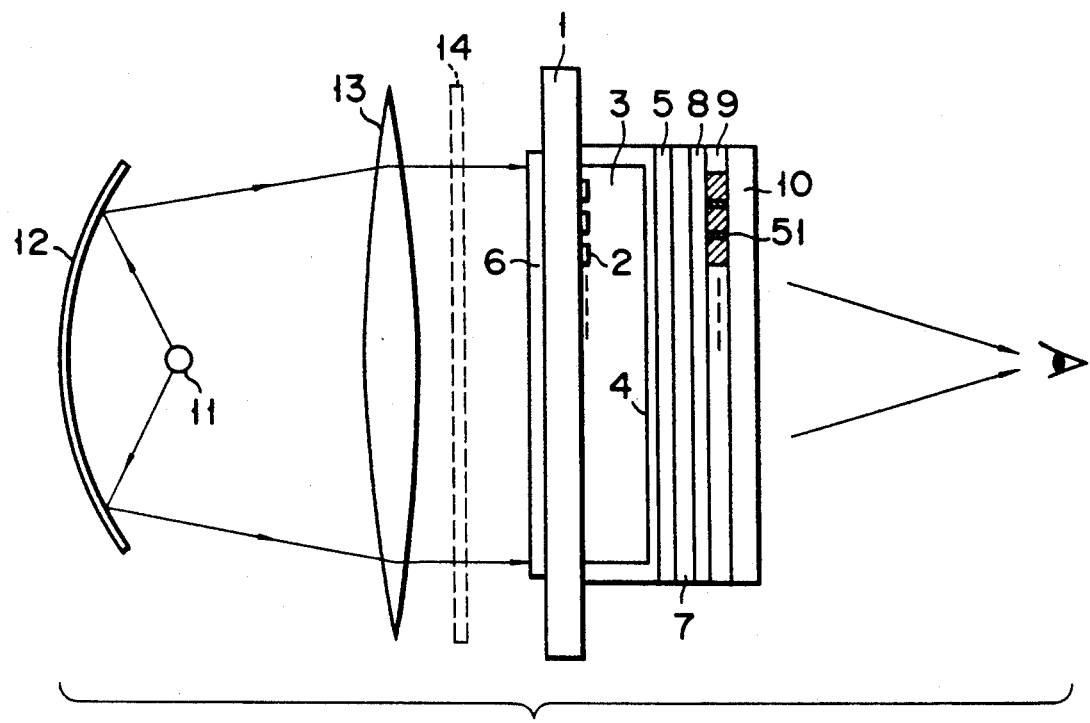
FIG. 3 is a side view showing a schematic arrangement of a transmission liquid crystal display apparatus according to an embodiment of the present invention.

FIG. 3 shows a schematic arrangement of a transmission color liquid crystal display apparatus according to an embodiment of the present invention. As is well known, a liquid crystal cell basically comprises an active matrix substrate 1, a glass substrate 5 on which a transparent electrode 4 is formed, and a TN liquid crystal layer 3 sealed between the substrates 1 and 5. Display electrodes 2 are formed in a matrix manner on the surface of the substrate 1 in contact with the layer 3.

Polarizing layers 6 and 7 are formed on both the surfaces of the liquid crystal cell. A glass substrate 10 having a color filter layer 9 is arranged at the display surface side of the liquid crystal cell via a light ray diffusion layer or film 8. The layer 9 is formed by arranging red, green, and blue color filter segments in a matrix manner. The layer 8 comprises, e.g., a film having small undulations, a transparent member having diffusion fine particles dispersed therein, or a microlens array. The layer 9 is formed by a dyeing method, or a printing method using a pigment or an behind the liquid crystal cell. Light rays from the light source 11 are collimated by a spherical lens 12 and a lens 13 and radiated on the liquid crystal cell as collimated light rays. In this case, the collimated light rays need not be strictly collimated light rays. That is, the collimated light rays need only be in a state in which a diffusion degree is sufficiently small, i.e., most of the radiated light rays are incident substantially perpendicularly on the liquid crystal cell.

The light source 11 is, e.g., a halogen lamp or fluorescent lamp. The lens 13 may be a conventional refracting lens or a Fresnel lens. If more occurs due to a difference between a groove pitch and a pixel segment pitch of the Fresnel lens, a diffusion plate 14 which has a low diffusion degree and therefore slightly diffuses the collimated light rays is arranged after the lens as shown in FIG. 3, thereby effectively suppressing the moire.

The liquid crystal cell is actually manufactured as follows. That is, an electrode material is deposited to form the transparent electrode 4 on the glass substrate 5. The color filter layer 9 is formed on another glass substrate 10, and the diffusion layer 8 for diffusing light rays and the polarizing layer 7 are formed thereon. The glass substrate 10 having these layers is adhered on the glass substrate 5. A substrate structure in which a plurality of function layers are integrally stacked is opposed and sealed to the active matrix substrate 1 with a small gap, and the liquid crystal layer 3 is injected in the gap. In a test example, a distance between the transparent electrode 4 and the color filter layer 9 is maintained 250 fm. A black matrix 51 for preventing light rays from passing therethrough may provided around a color filter of each pixel segment to shut light rays from region between adjacent pixels. The black matrix may be formed into a mesh form, which is located above the color filter layer 9 and is aligned with the color filter in a manner that the black matrix 51 is faced to a region between adjacent pixel segments.

The transmission color liquid crystal display apparatus of this embodiment manufactured as described above has an angle of view much wider than that of a conventional apparatus and a contrast ratio of 50 or more through 40° vertically and 60° horizontally. In the conventional transmission color liquid crystal display apparatus, a color tone changes as an angle of view is inclined from the normal direction of the display surface. In this embodiment, however, although the light intensity is slightly reduced, good image quality can be obtained even in the oblique direction without changing the color tone. In addition, since the light diffusion layer is located very close to the color filter layer, pixel segments are not obscured, and a clear image is obtained. Furthermore, even if external light rays are radiated on the display surface, reflected and diffused light rays are not increased. Therefore, since the screen is not whitened, the display apparatus of the present invention can be used in a bright environment.

The light diffusion layer 8 need not completely isotropically diffuse light rays incident thereon but need only diffuse them through a certain angle range with respect to an observer. In this embodiment, the diffusion layer 8 is formed independently of the color filter layer 9. However, the layers 8 and 9 may be integrally formed, i.e., the color filter itself may have the light diffusion function. In this manner, manufacturing steps can be simplified, and the distance between the transparent electrode and the color filter can be decreased. As a result, an aperture ratio is increased to realize a bright screen.

Another embodiment of the transmission color liquid crystal display apparatus of the present invention will be described below.

Figure 4:
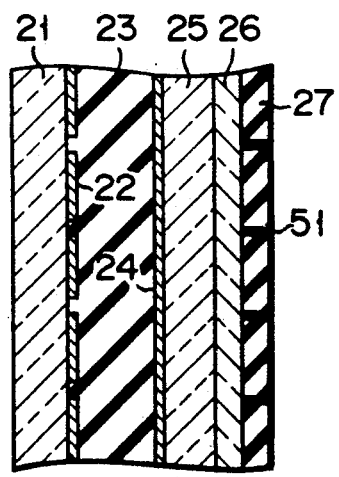
FIG. 4 is a sectional view showing a liquid crystal cell structure incorporated in the apparatus shown in FIG. 1 in place of a liquid crystal cell unit shown in FIG. 3.

FIG. 4 shows a structure of a liquid crystal cells portion according to another embodiment of the present invention. In this embodiment, a polarizing glass substrate is used as an active matrix substrate 21. Similar to the embodiment shown in FIG. 3, pixel segment electrodes 22 are formed on the surface of the substrate 21 in contact with a liquid crystal layer 23. Similarly, a counter substrate 25 on which a transparent electrode 24 is formed consists of polarizing glass. A light diffusing layer and a color filter layer 27 are formed on the surface of the counter substrate 25. When collimated light rays are radiated on the transmission color liquid crystal display apparatus having the above arrangement shown in FIG. 4, the same effects as those of the embodiment shown in FIG. 3 can be obtained.

Figure 5:
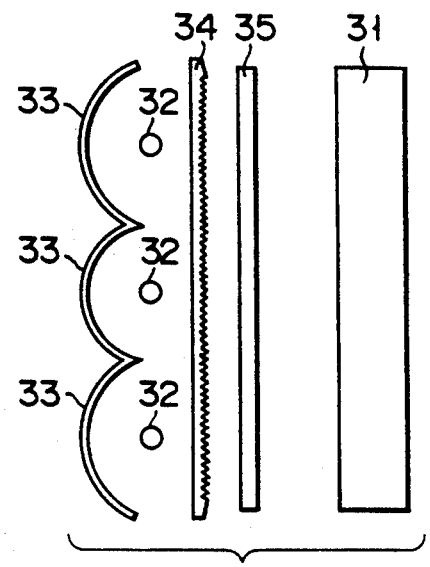
FIGS. 5 and 6 are side views showing a schematic arrangement of a transmission liquid crystal display apparatus according to another embodiment of the present invention having a light source unit of a different arrangement.

Still another embodiment shown in FIG. 5 comprises a plurality of light sources 32 as a light source unit and a plurality of spherical reflecting mirrors 33 for collimating light rays from the light sources. Referring to FIG. 5, reference numeral 31 denotes a liquid crystal cell including the light diffusing function explained in the embodiment shown in FIG. 3; 34, a Fresnel lens; and 35, a diffusion plate having a low diffusion degree. In this manner, the light source unit may be a set of a plurality of point light sources.

Figure 6:
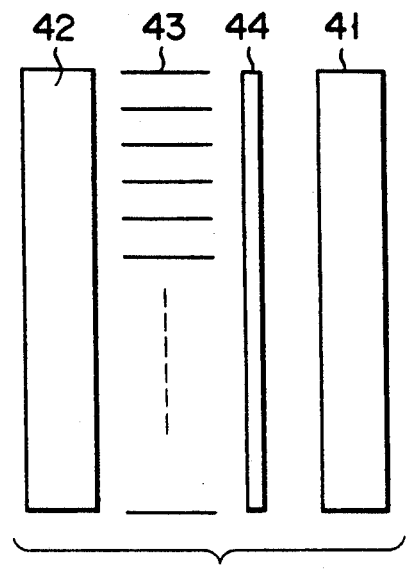

In still another embodiment shown in FIG. 6, as a means for collimating light rays from a light source unit 42, optical waveguides 43, constituting a honeycomb structure consisting of, e.g., an Al alloy, for guiding light rays is used. The interior of each waveguide is blackened to prevent reflection of the light rays, thereby substantially collimating the light rays. Reference numeral 41 denotes a liquid crystal cell including the light diffusion function; and 44, a diffusion plate having a low diffusion degree.

Figure 7:
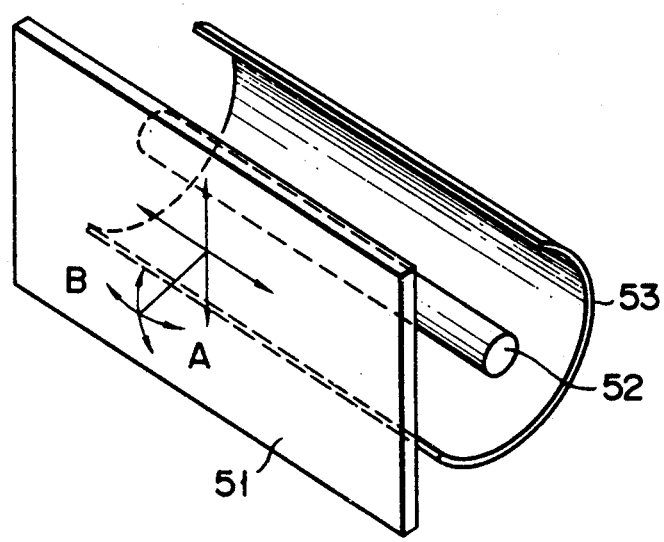
FIG. 7 is a view showing an arrangement of a light source unit of a transmission liquid crystal display apparatus according to still another embodiment of the present invention.

In still another embodiment shown in FIG. 7, a linear light source 52 is arranged to oppose a semi-cylindrical reflecting mirror 53. Light rays from the light source 52 are converted into radiating light rays having a high collimation degree in only one axial direction by the reflecting mirror 53. In FIG. 7, reference numeral 51 denotes a liquid crystal cell including the same light diffusing function as that of each of the above embodiments. An angle of view of the liquid crystal cell normally has a directivity, i.e., is often wide in one direction and narrow in a direction perpendicular thereto. In this case, by increasing a collimation degree of the light source in only the direction in which the angle of view is narrow as shown in FIG. 7, the angle of view can be effectively improved.

Figure 8:
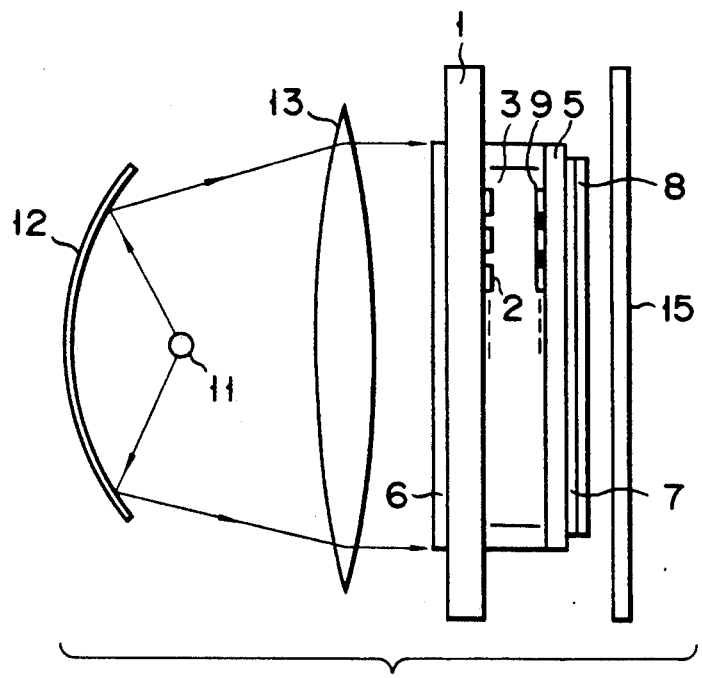
FIG. 8 is a view showing a schematic arrangement of an embodiment of a transmission liquid crystal display apparatus in which a color filter and a diffusion layer are arranged in a reversed order.

FIG. 8 shows a liquid crystal display apparatus according to still another embodiment of the present invention. In FIG. 8, the same reference numerals as in FIG. 3 denote the same parts and a detailed description thereof will be omitted. In the embodiment shown in FIG. 8, a color filter layer 9 is formed on the inner surface of a glass substrate 5 opposing a liquid crystal cell. A gray filter 15 for preventing reflection of external light rays is arranged at the outermost portion of the display surface side of the liquid crystal cell. Since the external light rays are transmitted through the filter 15 twice, i.e., when they are incident and reflected from a diffusion plate 8, reflected components of the rays are largely reduced. Therefore, an influence of the external light rays can be sufficiently reduced.

Figure 9:
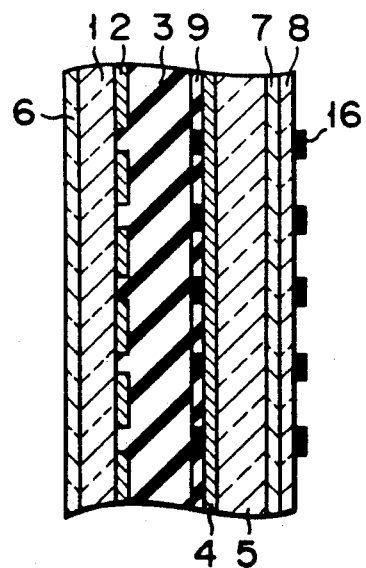
FIGS. 9 and 10 are views showing a liquid crystal cell unit of an embodiment of a transmission liquid crystal display apparatus in which a color filter and a diffusion layer are arranged in a reversed order.

As shown in FIG. 9, reflection of external light rays can be effectively prevented by arranging a black matrix 16 outside a diffusion plate 8. A portion of the matrix 16 corresponds to a black matrix portion of a color filter layer 9 and a wiring portion of an active matrix substrate 1 and is a region not having transmitted light rays. Therefore, if external light rays are reflected from this portion, image quality is degraded accordingly. According to this embodiment having the above arrangement, however, degradation in image quality is suppressed to clarify an image. In the apparatus shown in FIG. 9, a gray filter is preferably formed in order to prevent reflection of external light rays, as in the apparatus shown in FIG. 8. When the diffusion plate is arranged after the color filter layer as in the embodiments shown in FIGS. 8 and 9, light rays from a pixel segment are slightly diverged before they reach the diffusion plate due to light ray components in the oblique direction from the light source. Since the light rays are already transmitted through the color filter, however, no color difference occurs. Therefore, since the thickness of the substrate opposing the liquid crystal cell need not be largely decreased, the gap of the liquid crystal cell can be maintained constant while mechanically sufficient strength can be given to the liquid crystal.

Figure 10:
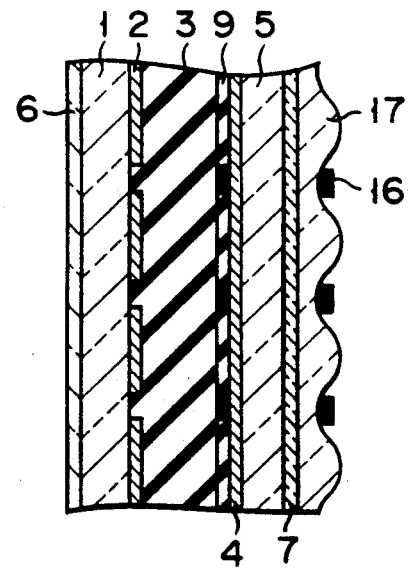

FIG. 10 shows an apparatus obtained by slightly modifying the structure shown in FIG. 7. In this apparatus, a microlens array 17 is used in place of the light diffusion layer 8. This structure has an advantage of a small light loss. In this structure, uniformity of light diffusion is slightly degraded. However, the uniformity can be improved by inserting a light diffusion layer having a low light diffusion degree between the microlens array 17 and the polarizing layer 7.

There will be described yet another embodiments with reference to FIGS. 11 to 16B.

Figure 11:
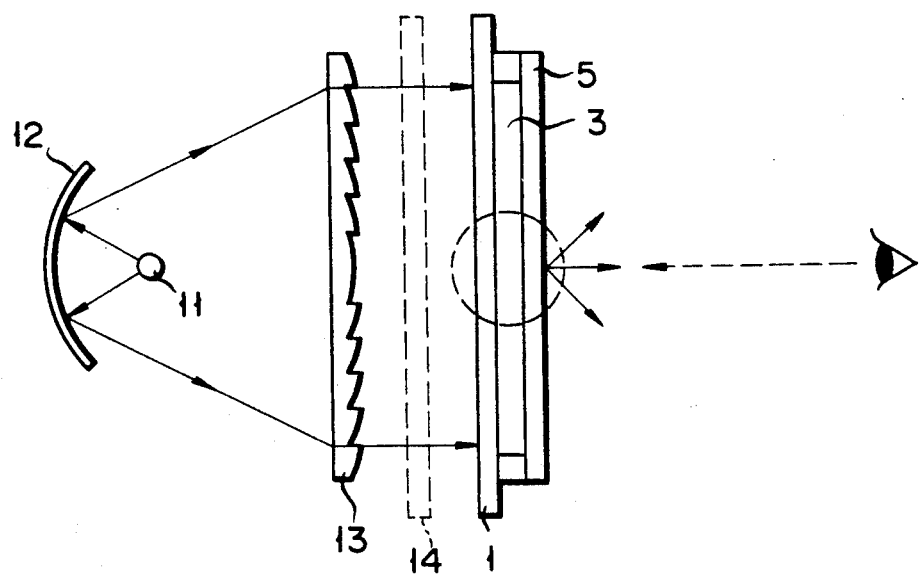
FIG. 11 is a side view showing a schematic arrangement of a transmission liquid crystal display apparatus according to an another embodiment of the present invention.
Figure 12:
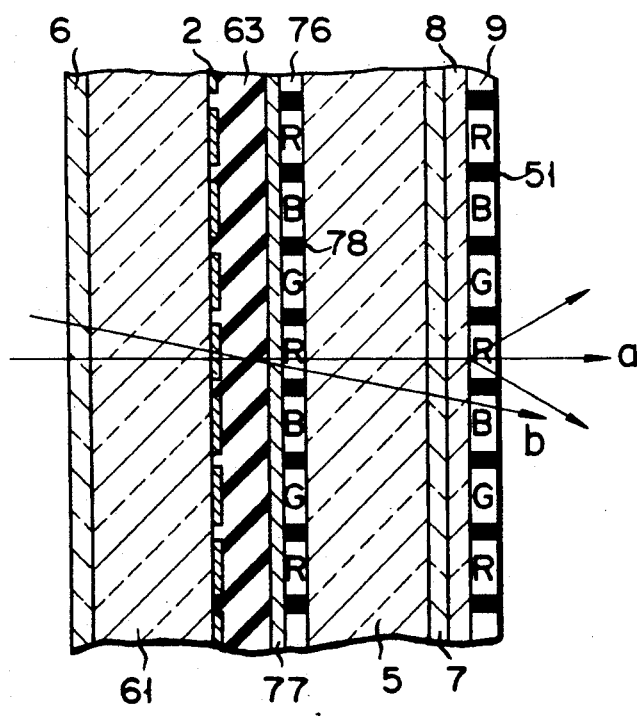
FIGS. 12 and 13 are sectional views each showing a liquid crystal cell structure incorporated in the apparatus shown in FIG. 11.

FIG. 11 shows a schematic arrangement of a transmission color liquid crystal display apparatus according to the yet another embodiment of the invention. A liquid crystal cell shown in FIG. 11 also comprises an active matrix substrate 1, a counter glass substrate 5, and a TN liquid crystal 3 sealed between the substrates 1 and 5. Display electrodes 2 are arranged on the surface of the substrate 1 in contact with the liquid crystal layer 3 as shown in FIG. 12. Polarizing layers 6 and 7 are formed on both the surfaces of the liquid crystal cell. A first color filter layer 9 is formed on a display surface side of the liquid crystal cell via a light diffusion layer 8. The layer 8 comprises a film having small undulations, a transparent member containing diffusion fine particles dispersed therein, a microlens array, or the like. The layer 9 is formed by a dyeing method, a printing method, an electro-deposition method, or the like. In place of forming the first color filter layer 9 on the light diffusion layer 8, the layer 9 may be formed on another substrate (e.g., a film or glass) and then adhered on the layer 8. Similarly, the light diffusion layer 8 may be formed at the side of either the first color filter layer 9 or the polarizing layer 7 or formed on an independent substrate and then adhered on still another layer. Note that the color filter layer 9 has a black matrix 51. Another light diffusing layer may be formed between the electrode 76 and the filter 76 and the color filters 9 and 76 may be formed into a unitary structure which is assembled into the apparatus including a combination of the linear light source and the light reflection mirror.

A light source unit 1 is also arranged behind the liquid crystal cell. Light rays emitted from a light source 1 are also collimated by the combination of a reflecting mirror 12, and a lens 13, as described above. The light source 1 is, e.g., halogen lamp or a fluorescent lamp. The lens 13 may be either a Fresnel lens or a conventional refracting lens. If moire occurs due to a difference between a groove pitch and a pixel segment pitch of the Fresnel lens, a diffusion plate 14 having a low diffusion degree is also arranged behind the lens as indicated by a broken line in FIG. 11 in a same manner as shown in FIG. 3. As a result, the moire can be effectively suppressed.

A second color filter layer 76 is further formed on the counter substrate 5, and a transparent electrode 77 is formed thereon. The second color filter 76 also has a black matrix 78.

An operation of this embodiment is as follows. That is, reference symbols a and b in FIG. 12 denote optical paths for transmitting light rays perpendicularly and obliquely to the liquid crystal cell. In the apparatus, a polarizing angle varies in accordance with a voltage applied across the pixel segment electrode 2 and the transparent counter electrode 77. Thus, in the optical path a, light intensity of the light rays is changed in accordance with the polarizing angle, when the light rays are transmitted through the polarizing layer 7 and emerged from the polarizing layer 7. The light rays emerged from the layer 7 is diffused obliquely by the light diffusion layer 8 and therefore can be viewed in any direction in addition to the normal direction when viewed from the display surface side. Light rays along the optical path b is obliquely incident on the liquid crystal cell. In the optical path b, since a polarizing angle upon transmission through the liquid crystal cell differs from that of the optical path a, the light rays emerged from through the polarizing layer 7 along the path b differs from that of the path a. However, colors of the first and second color filter layers 9 and 76 are different (in this embodiment, blue (B) and red (R), respectively) as shown FIG. 12 so that a component, i.e., a blue component of the light rays are permitted to pass through the second color filter layer 76, i.e., blue filter but the component is prevented from passing through the first color filter layer 76, i.e. red filter. Therefore, since the light rays are prevented from being passing therethrough and cannot be seen, no problem is posed.

The color liquid crystal display apparatus of this invention has an angle of view much wider than that of a conventional apparatus. That is, a contrast ratio of 50 or more is obtained through 45 vertically and 5 horizontally. In addition, since a conventional problem in that a color tone changes as an angle of view is inclined from the normal direction of the display surface is solved, good image quality is obtained.

If only the first color filter is to be used, the first color filter, the polarizing layer, and the light diffusion layer may be formed at the liquid crystal cell side of the counter substrate 5. In this embodiment, however, the polarizing layer 7 and the light diffusion layer 8 can be arranged at the display surface side of the counter substrate 5, i.e., outside the liquid crystal cell. As is well known, uniform characteristics of a liquid crystal cell cannot be obtained unless a cell gap (interval between the electrodes 2 and 77 is narrow, several microns (in this embodiment, 6 μm) and a gap variation is small, about +0.1 to 1 μm. In this embodiment, since only the second color filter can be arranged inside the liquid crystal cell, the uniformity of a cell gap can be sufficiently obtained. For example, the second color filter may be formed by a dyeing method which provides good flatness, while the first color filter is formed by a printing method which provides only poor flatness but good light resistance and mass-productivity. A combination is not limited to this one as long as the second color filter layer 76 has flatness. Therefore, since flatness is not required for the first color filter 9, the polarizing layer 7, or the light diffusion layer 8, each having optimal optical characteristics, a heat resistance, or the like can be advantageously selected.

In addition, even when external light rays are radiated on the display surface by the first color filter, reflected diffusion light is not increased. Therefore, since the screen is not whitened, the display apparatus of this embodiment can be used in a bright environment.

Multiple color filters can be used to improve the optical characteristics as a whole. In addition, the density of the second color filter can be decreased to decrease the thickness.

Figure 13:
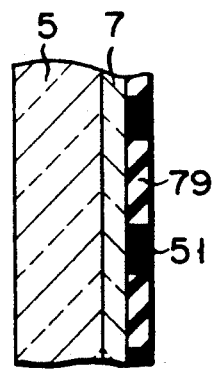

FIG. 13 shows a modified embodiment of the invention. In this embodiment, a first color filter 79 itself has a light diffusing function. A black matrix 51 may be similarly arranged. In this embodiment, manufacturing steps can be simplified by simultaneously forming a light diffusion layer and a color filter.

Note that a light diffusion layer 8 need not completely isotropically diffuse incident light rays but need only diffuse the light rays through a certain angle with respect to an observer.

Although color filters can be variously arranged, an arrangement shown in FIG. 14A is most preferred in this embodiment. In this arrangement, pixel segments in contact with a certain color component have different colors, and an shutting effect can be obtained for oblique light in any direction. FIG. 14B shows an oblique mosaic arrangement. In FIG. 14B, however, since pixel segments having the same color are adjacent to each other in a direction from lower left to upper right corners, the shutting effect is weak for oblique light rays in this direction. In FIG. 14C, the effect is weak for oblique light rays in a longitudinal direction. This problem can be solved by improving a light source so as to sufficiently decrease incident light rays in these directions. In addition, since a liquid crystal has a direction along which an angle of view is wide, this direction may be coincided with the direction having only a weak effect for oblique light rays to effectively solve the above problem.

In the optical arrangement which includes the semicircular mirror 53 extending along the horizontal direction as shown in FIG. 7, a liquid crystal cell unit preferably has an color filter arrangement shown in FIG. 14D. In the arrangement shown in FIG. 14D, each color filter stripe is extended in the horizontal direction along which an angle of view is wide. With this arrangement, not only no problem is posed in angle of view due to horizontal oblique light, but also light utilization efficiency can be increased to increase brightness of the screen. In the case of the longitudinal stripe shown in FIG. 14C, a direction along which an angle of view of a liquid crystal is wide may be set to correspond to a vertical direction. When vertical collimation is sufficiently high in an embodiment in which the optical arrangement shown in FIG. 7 is so arranged that it rotated at 90°, the color filter arrangement shown in FIG. 14C is preferably used instead of the arrangement shown in FIG. 14d.

FIG. 15 shows still another embodiment. Referring to FIG. 15, widths of black matrixes 51 of a first color filter 9 shown in FIG. 16A and a second color filter 76 shown in FIG. 16B are set different from each other, thereby shutting oblique light in the above color filter arrangement. In this embodiment, a width of a black matrix between color filter segments of the same color is increased in the first color filter. As a result, light along an optical path d in FIG. 15 can be effectively shut. Note that this effect can be realized by widening the black matrix of the second color filter.

In the above embodiments, the TN liquid crystal is used. However, the present invention can be applied to a GH liquid crystal. In addition, the present invention can be applied to a liquid crystal display device of not only the active matrix type but also a simple matrix matrix type.

As has been described above, according to the present invention, there is provided a transmission liquid crystal display apparatus in which an angle of view is wide, a color tone does not change even if a screen is viewed in an oblique direction, and the same color tone and contrast can be obtained on a wide screen when viewed in many directions. Even if oblique light from a light source is more or less present, this light can be effectively suppressed.

Therefore, collimation of the light source need not be strictly set. As a result, the light source unit can be made thin, can have a plurality of lamps, or the like, i.e., a suitable light source can be manufactured.

In each of the above embodiments, the TN liquid crystal is used. However, the present invention can be applied to a GH liquid crystal. In addition, the present invention can be applied to a liquid crystal display apparatus of not only the active matrix type but also a simple matrix type.

As has been described above, according to the present invention, the transmission liquid crystal display apparatus in which an angle of view is wide, a color tone does not change even if a screen is viewed in an oblique direction, and the same color tone and contrast can be obtained on a wide screen when viewed in many directions.

What is claimed is:

1. A transmission color display apparatus comprising:
   generating means for generating substantially collimated light rays;
   shutting means, including a plurality of pixel segments, for shutting the light rays from said generating means, each of said plurality of pixel segments selectively permitting transmission of the light rays;
   diffusing means for slightly diffusing the light rays from said shutting means; and
   first color filter means formed on said diffusing means and including first color filter segments arranged in correspondence with each pixel segment, each of the filter segments transmitting light rays of a specific color of the diffused light rays.

2. An apparatus according to claim 1, wherein said generating means includes a light source for emitting light rays, reflecting means for reflecting the light rays from said light source, and collimating means for substantially collimating the light rays from said light source and said reflecting means.

3. An apparatus according to claim 1, wherein said generating means includes a plurality of light sources for emitting light rays, a plurality of reflecting mirrors, arranged in correspondence with said light sources, for reflecting the light rays from said light sources, and collimating means for substantially collimating the light rays from said light sources and said reflecting mirrors.

4. An apparatus according to claim 1, further comprising second diffusing means, arranged between said generating means and said shutting means, for diffusing the light rays from said generating means.

5. An apparatus according to claim 1, wherein said filter means includes a black matrix, arranged between said color filter segments, for preventing the light rays from passing therethrough.

6. An apparatus according to claim 1, wherein said shutting means comprises liquid crystal cells.

7. A transmission color display apparatus according to claim 1, further comprising:
   second color filter means including second color filter segments, arranged in correspondence with each pixel segment and located between said shutting means and said diffusing means, for selectively transmitting light rays from said shutting means.

8. A transmission color display apparatus according to claim 7, wherein each of the second color filter segments has a size different than that of the first color filter segments.

9. An apparatus according to claim 7, wherein said shutting means comprises a liquid crystal cell structure including liquid crystal cells and a transparent plate having one surface and an opposite surface facing the liquid crystal cells, said first filter means being formed on the one surface of the transparent plate and the second filter means being formed on the opposite surface of the transparent plate.

10. A transmission color display apparatus having a first plane, comprising:
    at least one linear light source, having a light source axis, for generating light rays;
    collimating means, having a major axis substantially parallel with the light source axis, for reflecting the light rays from said light source and collimating the light rays along a first plane;
    shutting means, including a plurality of pixel segments, for shutting the light rays from said generating means, each of said plurality of pixel segments selectively permitting transmission of the light rays;
    diffusing means for slightly diffusing the light rays from said shutting means; and
    first color filter means formed on said diffusing means and including first color filter segments arranged in correspondence with each pixel segment, each of the first color filter segments transmitting light rays of a specific color of the diffused light rays.

11. An apparatus according to claim 10, wherein said collimating means includes a reflector for reflecting the light rays from said light source, and a collimator for substantially collimating the light rays from said light source and said reflector.

12. An apparatus according to claim 10, comprising:
a plurality of said light sources for emitting light rays; and
said collimating means comprising a plurality of reflecting mirrors, arranged in correspondence with said light sources, for reflecting the light rays from said light sources, and a collimator for substantially collimating the light rays from said light sources and said reflecting mirrors.

13. An apparatus according to claim 10, further comprising second diffusing means, arranged between said light source and said shutting means, for diffusing the light rays from said light source.

14. An apparatus according to claim 10, wherein said filter means includes a black matrix, arranged between said color filter segments, for preventing the light rays from passing therethrough.

15. An apparatus according to claim 10, wherein said shutting means comprises liquid crystal cells.

16. A transmission color display apparatus according to claim 10, further comprising:
second color filter means including second color filter segments, arranged in correspondence with each pixel segment and located between said shutting means and said diffusing means, for selectively transmitting light rays from said shutting means.

17. A transmission color display apparatus according to claim 16, wherein each of the second color filter segments has a size different than that of the first color filter segments.

18. An apparatus according to claim 16, wherein said shutting means comprises a liquid crystal cell structure including liquid crystal cells and a transparent plate having one surface and an opposite surface facing liquid crystal cells, and first color filter means being formed on the one surface of the transparent plate and the second color filter means being formed on the opposite surface of the transparent plate.

* * * * *